(12) United States Patent
Saito et al.

(10) Patent No.: US 7,082,233 B2
(45) Date of Patent: Jul. 25, 2006

(54) OPTICAL SWITCH AND METHOD OF MANUFACTURING THE SAME

(75) Inventors: Takeshi Saito, Hyogo (JP); Seiichiro Tabata, Hyogo (JP); Tatsuo Hatta, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 167 days.

(21) Appl. No.: 10/781,754

(22) Filed: Feb. 20, 2004

(65) Prior Publication Data
US 2004/0240778 A1 Dec. 2, 2004

(30) Foreign Application Priority Data
May 30, 2003 (JP) .............................. 2003-153951

(51) Int. Cl.
*G02B 6/26* (2006.01)
*G02B 6/42* (2006.01)

(52) U.S. Cl. .............................. 385/21; 385/16; 385/20; 385/31; 385/39; 385/50

(58) Field of Classification Search .................. 385/21
See application file for complete search history.

(56) References Cited
U.S. PATENT DOCUMENTS
6,519,381 B1 2/2003 Hatta et al.
2002/0067878 A1 * 6/2002 Hatta et al. ................. 385/16
2002/0168133 A1 11/2002 Saito

OTHER PUBLICATIONS

Saito et al., "Mechanical optical switch flexible polymeric waveguide", Optical Fiber Communication Conference and Exhibit, 2002. OFC 2002 Mar. 17-22, 2002 pp. 14-15.*
Takeshi Saito, et al., "A study on loss reduction in Bascule optical switch", p. 264 of Proceedings of the 2003 IEICE General Conference, The Institute of Electronics, Information and Communication Engineers, published on Mar. 3, 2003.

* cited by examiner

*Primary Examiner*—Frank G. Font
*Assistant Examiner*—Ryan Lepisto
(74) *Attorney, Agent, or Firm*—Leydig, Voit & Mayer, Ltd.

(57) ABSTRACT

An optical switch includes a film consisting of a polymer, a keep plate having a switching through hole and a driver. The film has a core linearly extending therein and a notch extending across a switching portion located halfway in the core. The keep plate holds the film to expose the switching portion at the through hole. The driver is employed for narrowing and separating a gap of the notch, thereby selecting a route of light. The notch is formed by precedently forming a starting groove on the surface of the film and pressing the switching portion with a pressing member from the backside of the starting groove while holding the film with the keep plate thereby causing cleavage.

3 Claims, 11 Drawing Sheets

OPTICAL SWITCH AND METHOD OF MANUFACTURING THE SAME

BACKGROUND OF THE INVENTION

1. Field of the Invention

The present invention relates to an optical switch employed for switching an optical path in optical communication equipment.

2. Description of the Background Art

U.S. Pat. No. 6,519,381 discloses an exemplary optical switch based on prior art. This optical switch employs a polymer optical waveguide film as a medium transferring light. In the polymer optical waveguide film formed by a polyimide film serving as the matrix, linear portions, referred to as cores, slightly higher in refractive index than the peripheral portion (clad portion) are two-dimensionally embedded and arranged in the form of a lattice. A notch is formed on the intersection between the cores. This optical switch is formed by holding the polymer optical waveguide film having the notch with keep plates having through holes corresponding to the intersection between the cores respectively to expose this intersection through the through holes respectively and arranging a driving member on each or a single surface of the intersection between the cores.

When the notch is closed in this optical switch, light is transmitted through this portion. This state is referred to as "transmissive state". When the polymer optical waveguide film is pressed with the driving member from the backside of the notch, on the other hand, the notch is open to define a layer of air between the cores opposed to each other through the notch. If the refractive indices of the cores and the clad portion and the angle of intersection between the cores are properly set in advance, light going to pass through the optical switch is totally reflected when the notch is open to form an air layer having a sufficient thickness therein. In other words, the optical switch can switch the optical path. This state is referred to as "reflective state".

As shown in FIG. 8 of U.S. Pat. No. 6,519,381, a plurality of cores are provided on each of input and output sides while notches are formed on respective intersections between these cores, and one of the notches intersecting with each core of the input side is in a reflective state and the other notch is in a transmissive state so that the input ports and the output ports are in one-to-one correspondence to each other. Thus, the optical switch can guide light to a desired output port.

In the optical switch disclosed in U.S. Pat. No. 6,519,381, each notch is formed with a sharp cutter or the blade of a dicer or the like. Alternatively, the notch is formed by causing cleavage while introducing the cutter or the blade.

When the notch is formed by introducing a cutter, however, chips result from this cutting, and the side surface of the cutter rubs against the workface. Thus, the side surface of the notch forming the workface is rendered irregular. In other words, the reflecting surface is rendered irregular in the reflective state. Such an irregular reflecting surface disadvantageously increases reflection loss. Also when the notch is closed to implement a transmissive state, further, the irregular side surface of the notch defines a small air gap in the notch. The small air gap reflects part of light, which in turn advances toward a reflecting port despite the transmissive state, to disadvantageously result in a crosstalk.

When the notch is formed with a dicer while rotating the blade thereof, on the other hand, the workface polished by the rotated blade exhibits a certain degree of smoothness. However, the material is partially whittled due to complete cutting, to generally result in a cut margin of about 15 μm in width. In this case, it is almost impossible to obtain a sufficiently excellent transmissive state, although a reflective state can be readily obtained.

SUMMARY OF THE INVENTION

Accordingly, an object of the present invention is to provide an optical switch reducing reflection loss caused by a workface in a reflective state as well as transmission loss or a crosstalk in a transmissive state and a method of manufacturing the same.

In order to attain the aforementioned object, the optical switch according to the present invention comprises a film basically consisting of a polymer, a keep plate having a switching through hole and driving means. The aforementioned film has an optical waveguide linearly extending therein and a notch provided across a switching portion provided halfway the aforementioned optical waveguide. The aforementioned keep plate holds the aforementioned film to expose the aforementioned switching portion from the aforementioned switching through hole. Further, the aforementioned driving means is employed for approximating and separating a gap of the aforementioned notch thereby selecting a route of light. The aforementioned notch is formed by precedently forming a starting groove on the surface of the aforementioned film and pressing the aforementioned switching portion with a pressing member from the backside of the aforementioned starting groove while holding the aforementioned film with the aforementioned keep plate thereby causing cleavage.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
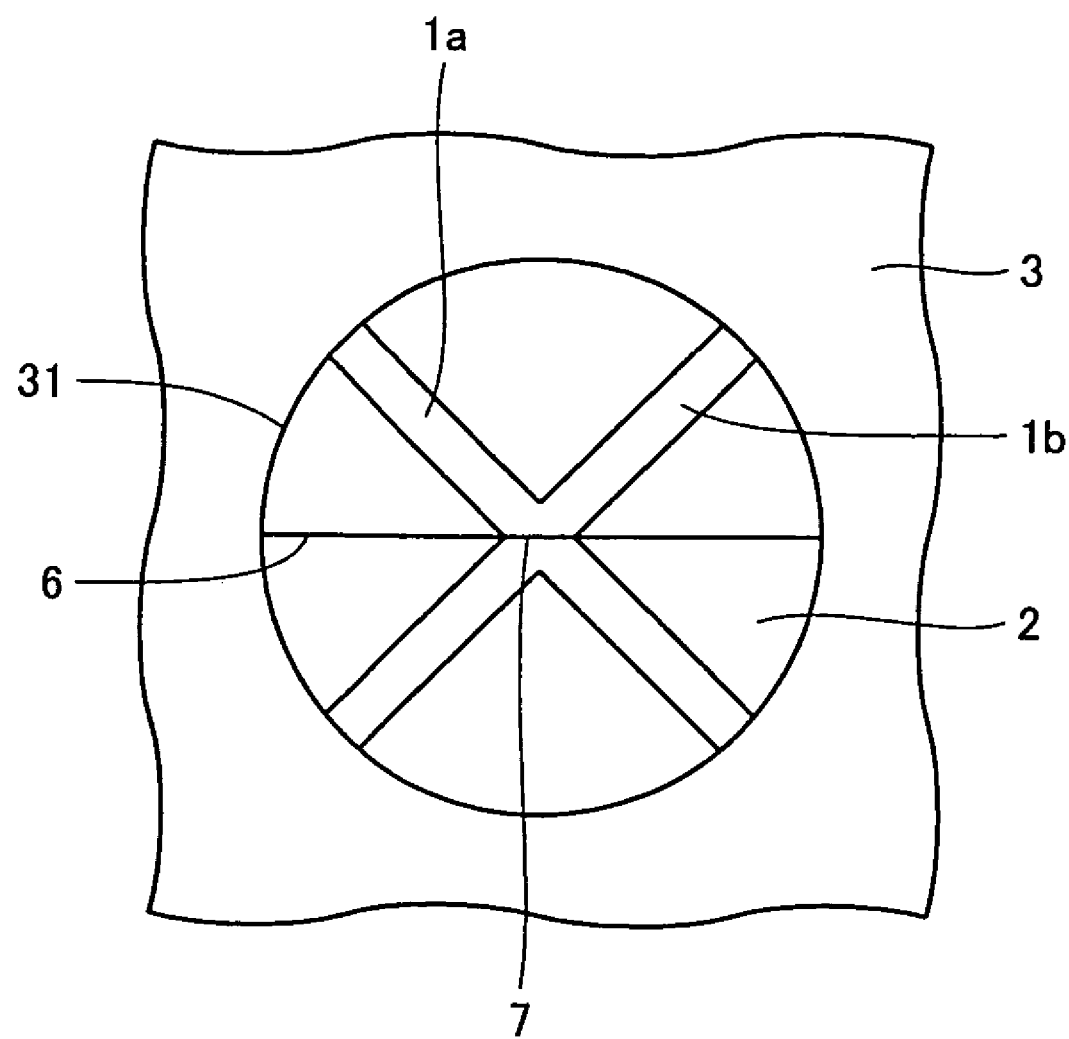
FIG. 1 is a plan view of an optical switch according to a first embodiment of the present invention.
Figure 2:
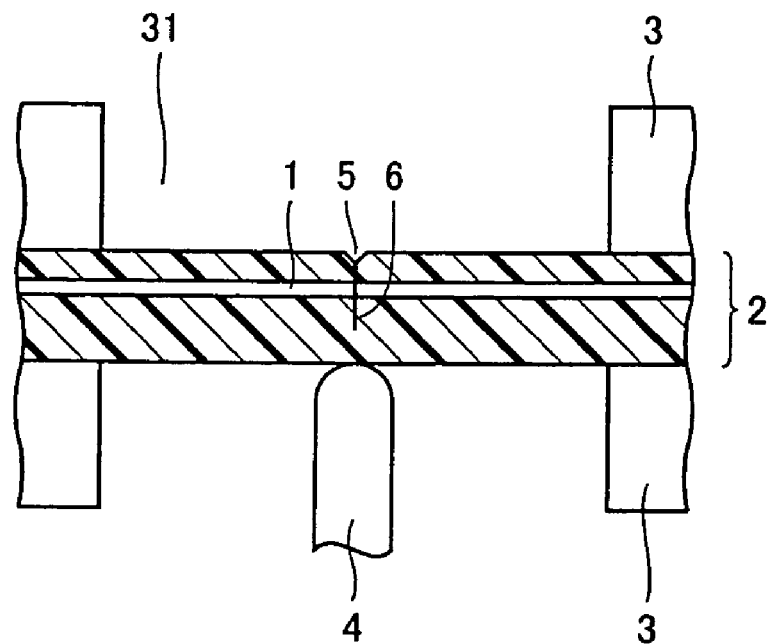
FIG. 2 is a sectional view showing the optical switch according to the first embodiment of the present invention in a transmissive state.
Figure 3:
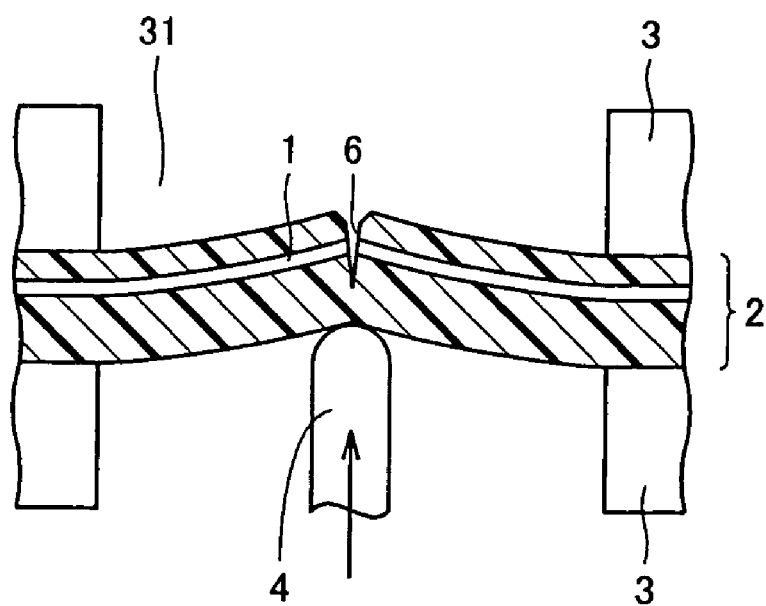
FIG. 3 is a sectional view showing the optical switch according to the first embodiment of the present invention in a reflective state.

An optical switch according to a first embodiment of the present invention is described with reference to FIGS. 1 to 3. As shown in FIGS. 1 and 2, this optical switch comprises a polymer optical waveguide film 2 basically consisting of a polymer and keep plates 3 holding the polymer optical waveguide film 2 therebetween. Cores 1 (1a and 1b) pass through the polymer optical waveguide film 2 as optical waveguides. A notch 6 is provided across a core intersection 7 where the cores 1a and 1b intersect with each other. The core intersection 7 is a switching portion for a route of light.

FIG. 2 is a sectional view of the optical switch. Referring to FIG. 2, the notch 6 is closed, i.e., in a transmissive state. The keep plates 3 have switching through holes 31. The keep plates 3 hold the polymer optical waveguide film 2 to expose the core intersection 7 and the notch 6 provided therein through the upper through hole 31. A pressing member 4 is arranged to be capable of pressing up the portion of the polymer optical waveguide film 2 provided with the notch 6 from below. The pressing member 4 is vertically displaceable by driving means (not shown). Referring to FIG. 3, the pressing member 4 is driven upward by the driving means. In this state, the pressing member 4 presses up the polymer optical waveguide film 2 from below thereby opening the notch 6. In other words, the notch 6 is in a reflective state.

The driving means is employed for approximating and separating a gap of the notch 6 thereby selecting the route of light.

Figure 4:
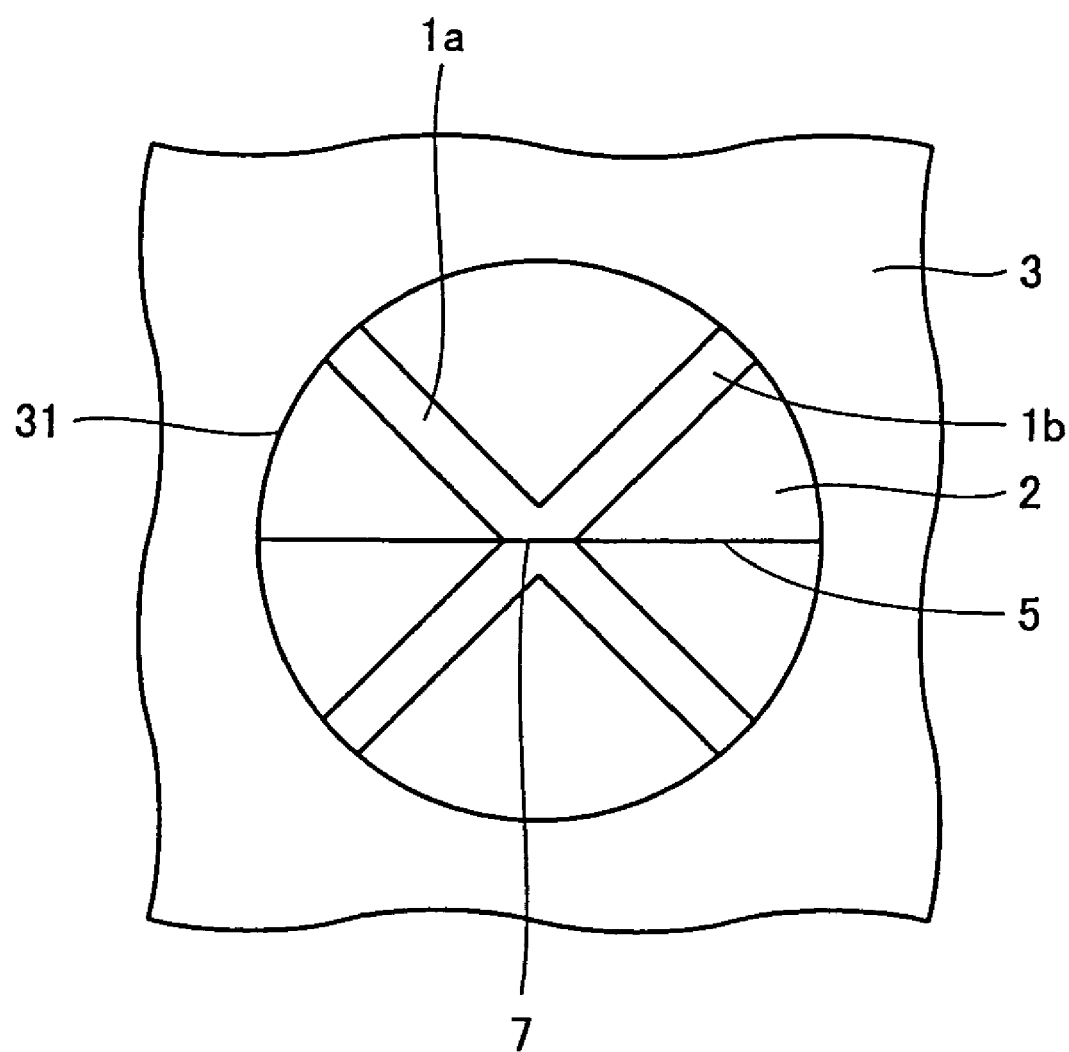
FIG. 4 is a plan view showing a state before cleavage in a method of manufacturing an optical switch according to the first embodiment of the present invention.

As shown in FIG. 4, the notch 6 is formed by precedently forming a starting groove 5 on the surface of the polymer optical waveguide film 2 and pressing the switching portion with the pressing member 4 from the backside of the starting groove 5 while holding the polymer optical waveguide film 2 with the keep plates 3 thereby causing cleavage.

Figure 5:
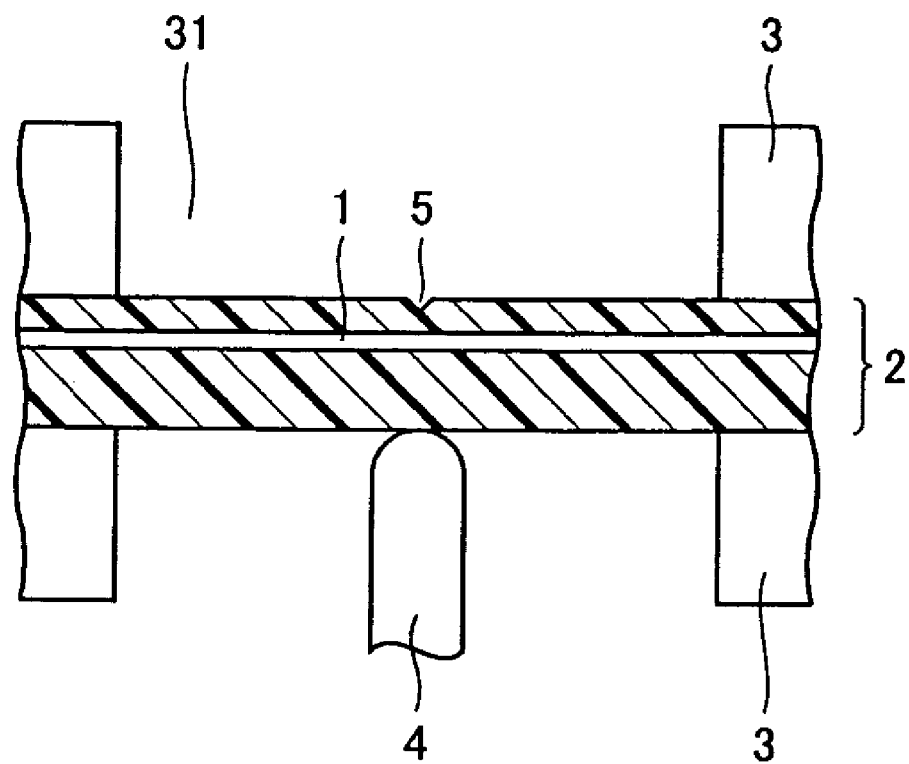
FIG. 5 is a sectional view showing the state before cleavage in the method of manufacturing an optical switch according to the first embodiment of the present invention.

The method of forming the notch 6 is now described in more detail. As shown in FIGS. 4 and 5, the keep plates 3 hold the polymer optical waveguide film 2 precedently shallowly formed with the starting groove 5 in the surface portion for forming the notch 6. The notch 6 is not yet formed at this point. The pressing member 4 is pressed up with the driving means (not shown) in this state, whereby stress concentrates on the starting groove 5. Further, a crack starts from the starting groove 5, which is the most fragile portion. In other words, cleavage is caused to form the notch 6 as shown in FIG. 3.

A method of manufacturing an optical switch according to the present invention includes a step of causing cleavage by pressing the polymer optical waveguide film 2 as described above. The working of causing cleavage by pressing the polymer optical waveguide film 2 is also referred to as cleavage.

The starting groove 5 may be a shallow groove. This starting groove 5 is preferably located above the center of each core 1 by a distance larger than half the mode field diameter of a beam propagated through the core 1. In other words, the distance between the bottom of the deepest portion of the starting groove 5 and the center of the core 1 is preferably larger than half the mode field diameter, for the following reason: The starting groove 5 is formed by cutting the polymer optical waveguide film 2 with a cutter or the like similarly to a conventional notch. If formed on a portion excessively close to the core 1, therefore, the starting groove 5 disadvantageously reflects a large quantity of light, to cause a problem similar to that in the prior art.

The starting groove 5 is preferably formed with the narrowest possible width. The width of the upper end of the starting groove 5, conceivably increased in particular on the deepest position, is preferably not more than 1 μm on this position. If the width of the upper end of the starting groove 5 is excessively large on the deepest position, cleavage progresses from an indefinite cross-directional position, to disadvantageously result in an irregular workface.

Referring to FIGS. 2 and 5, the starting groove 5 is exaggeratedly enlarged for convenience of illustration.

The cleavage step is preferably carried out by repetitively moving up and down the pressing member 4 thereby repetitively fatiguing the polymer optical waveguide film 2 rather than by simply moving up the pressing member 4 once. Thus, progress of cleavage can be quickened while reducing the time for action of excess stress.

When the uncracked polymer optical waveguide film 2 is abruptly pressed up with a large displacement, force acting at this time does not contribute to progress of cleavage (progress of cracking) but excess stress may act on the contact portions between the pressing member 4 and the polymer optical waveguide film 2 and between the inner peripheral edge of the through hole 31 of the keep plate 3 and the polymer optical waveguide film 2, disadvantageously leading to plastic deformation of the polymer optical waveguide film 2. In order to avoid such inconvenience, it is preferable to initially repetitively move up and down the pressing member 4 and then gradually increase the displacement for pressing up the polymer optical waveguide film 2 until the depth of the notch 6 reaches a desired value.

Figure 6:
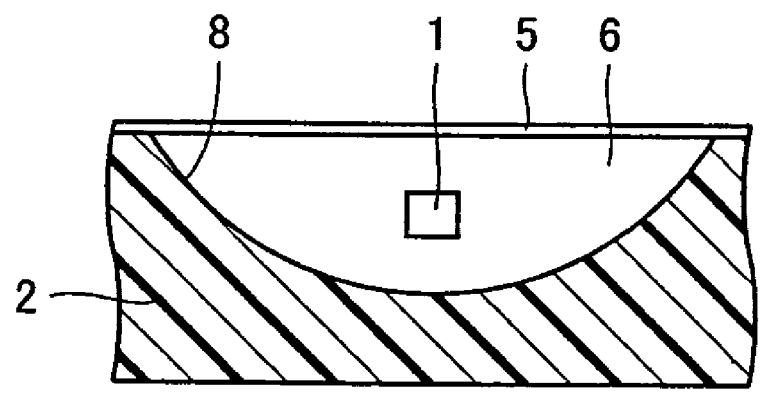
FIG. 6 is a sectional view of a notch resulting from cleavage in the method of manufacturing an optical switch according to the first embodiment of the present invention.

FIG. 6 is a sectional view of the notch 6 resulting from this cleavage. This figure shows the shape of the workface as viewed from a side portion. Each core 1 exposes its section in the notch 6. The notch 6 has an arcuately curved bottom 8, which is substantially linearized when the pressing member 4 presses up the polymer optical waveguide film 2 by a displacement identical to the depth of the deepest position of the bottom 8. When the pressing member 4 further presses up the polymer optical waveguide film 2, cracking further progresses to increase the depth of the notch 6. Thus, the depth of the notch 6 depends on the maximum displacement of the pressing member 4 in the cleavage step.

If the pressing member 4 does not further press up the polymer optical waveguide film 2 with a displacement exceeding the depth of the notch 6, no further cleavage takes place. When the pressing operation is carried out with a displacement smaller than the depth of the notch 6 in ordinary use of the optical switch, therefore, it is possible to avoid progress of cracking resulting from undesired cleavage.

According to the first embodiment, the notch 6 formed by cleavage without introducing a cutter or the like exhibits a smooth workface with no irregularity resulting from abrasion. Therefore, reflection loss can be reduced in the reflective state. Further, no cut margin is formed in the notch 6 formed by cleavage. Therefore, transmission loss can also be reduced in the transmissive state.

In addition, it is possible to prevent cracking from further progress during use by setting the displacement in the ordinary use to not more than the depth of the notch 6, thereby improving the reliability of the optical switch.

Further, it is possible to eliminate distortion resulting from cleavage by annealing the cleaved polymer optical waveguide film 2, thereby reducing loss caused by birefringence resulting from such distortion.

Second Embodiment

Figure 7:
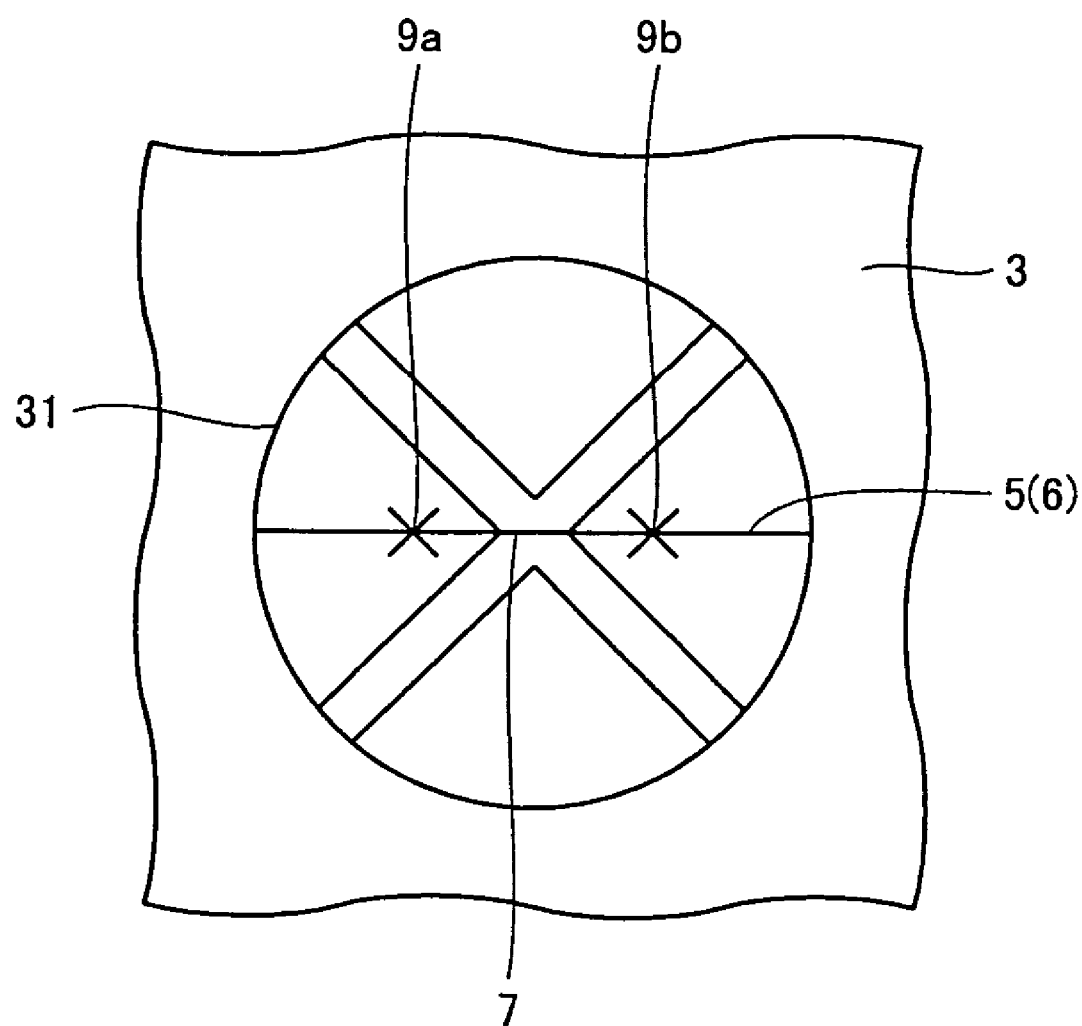
FIG. 7 is a plan view showing a portion pressed when a cleavage step is carried out in a method of manufacturing an optical switch according to a second embodiment of the present invention.
Figure 8A:
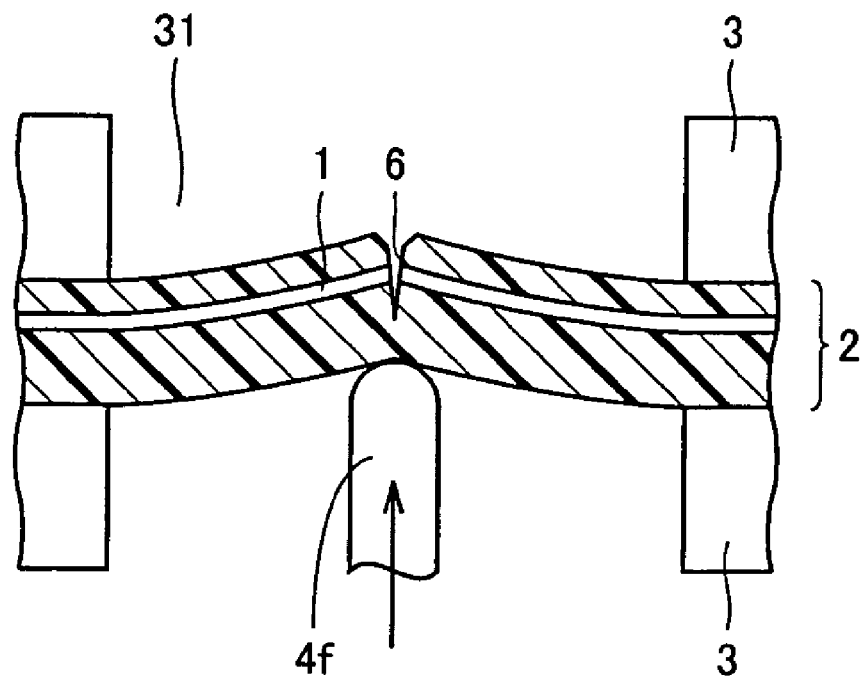
FIGS. 8A and 8B are side elevational views showing the cleavage step carried out in the method of manufacturing an optical switch according to the second embodiment of the present invention as viewed from two different directions perpendicular to each other.
Figure 8B:
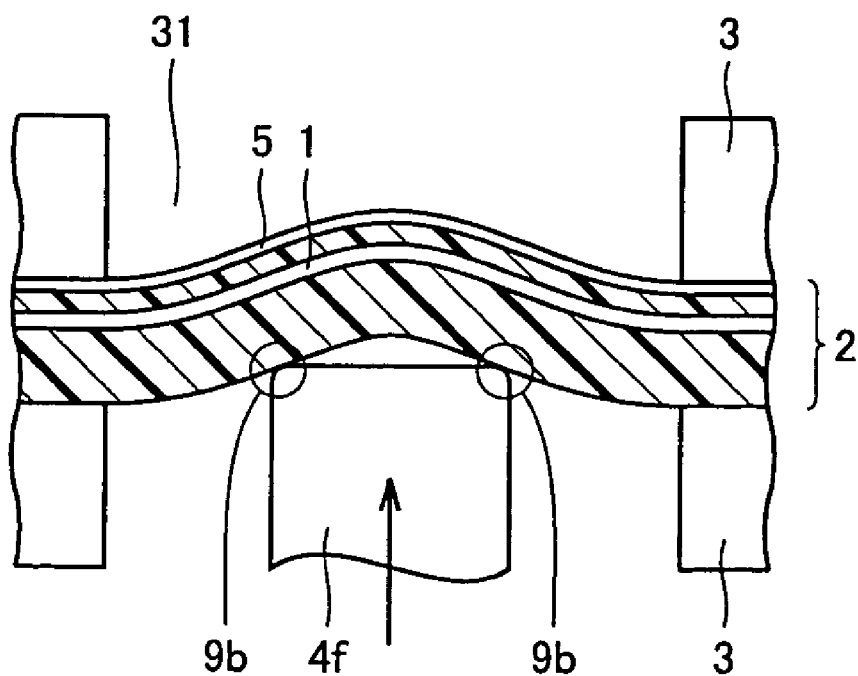

A method of manufacturing an optical switch according to a second embodiment of the present invention is described with reference to FIGS. 7, 8A and 8B. According to this method of manufacturing an optical switch, a pressing member 4f having a flat forward end similarly to a minus driver is employed as shown in FIGS. 8A and 8B. The pressing member 4f comes into contact with a polymer optical waveguide film 2 at contact points 9a and 9b, which are located on positions holding a core intersection 7 on the line of a starting groove 5 in plan view as shown in FIG. 7. The pressing member 4f, having a flat forward end similarly to a minus driver in the second embodiment, may alternatively have another shape so far as the same can come into contact with the polymer optical waveguide film 2 on two points holding the core intersection 7 on the line of the starting groove 5.

The aforementioned pressing member 4f is employed for pressing up the polymer optical waveguide film 2 similarly to the pressing member 4 described with reference to the first embodiment, thereby causing cleavage and forming a notch 6 as shown in FIG. 8A. The method of manufacturing an optical switch according to the second embodiment of the present invention includes this step.

Preferable conditions as to the starting groove 5 and those for pressing up the polymer optical waveguide film 2 are similar to those described with reference to the first embodiment.

According to the second embodiment, the pressing member 4f comes into contact with the polymer optical waveguide film 2 on the two contact points 9a and 9b, whereby cleavage first takes place not immediately above cores 1 but immediately above the contact points 9a and 9b. Cracks horizontally progress from these contact points 9a and 9b due to cleavage, to be connected with each other immediately above the core intersection 7. Thus, the notch 6 spreads over a desired range.

Figure 9:
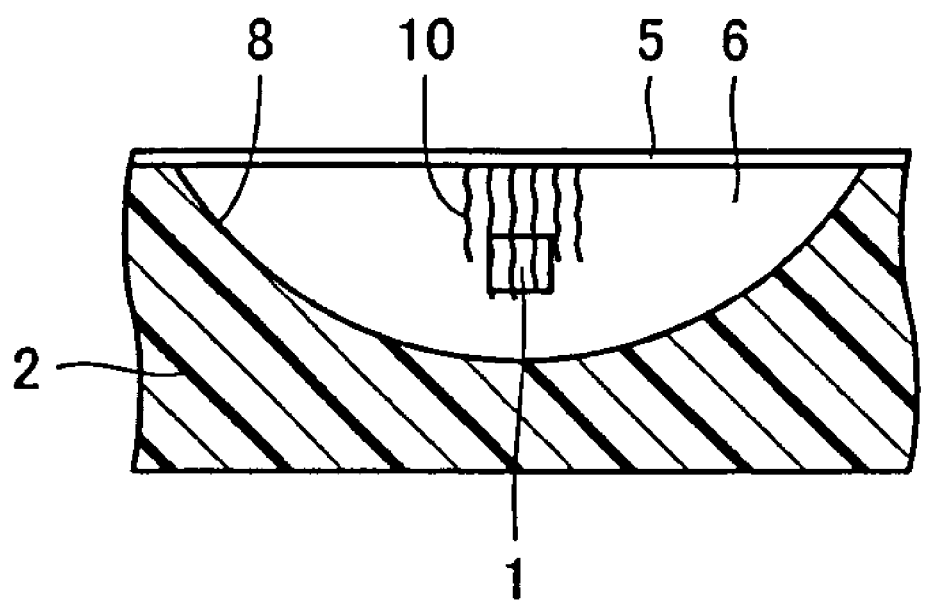
FIG. 9 is a sectional view of the notch streaked in the optical switch according to the first embodiment of the present invention.

A problem in the cleavage step is now described. In the first embodiment (see FIGS. 4 to 6), large stress takes place on the portion where the pressing member 4 is in contact with the polymer optical waveguide film 2 due to compression and is released at a stroke when cracking progresses, to facilitate this progress of cracking up to a certain depth. If the bottom of the starting groove 5 is loosely shaped, cracking may progress at a stroke from this portion with unstable directivity, to cause vertical streaks 10 on a position of the workface located immediately above a contact point as shown in FIG. 9. If the contact point is located immediately under the core intersection 7, the streaks 10 overlap with the exposed surface of each core 1 as shown in FIG. 9. These streaks 10 are so irregular that the same disadvantageously increase reflection loss when overlapping with the exposed surface of each core 1.

Figure 10:
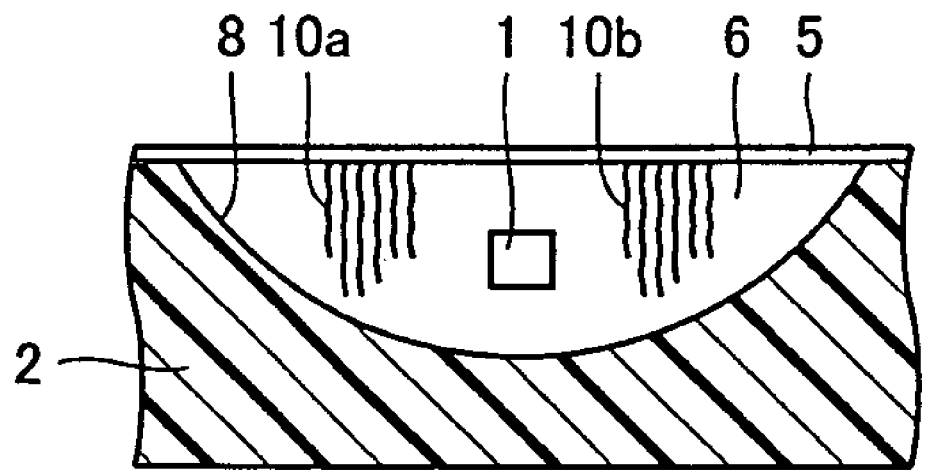
FIG. 10 is a sectional view of a notch streaked in the optical switch according to the second embodiment of the present invention.

According to the second embodiment, on the other hand, the contact points 9a and 9b (see FIG. 7) are not located immediately under but separated from the core intersection 7, whereby streaks 10a and 10b possibly caused on portions immediately above the contact points 9a and 9b do not overlap with the exposed surface of each core 1, as shown in FIG. 10. According to the second embodiment, therefore, it is possible to prevent reflection loss resulting from formation of the streaks 10a and 10b on the workface in the cleavage step.

Third Embodiment

Figure 11:
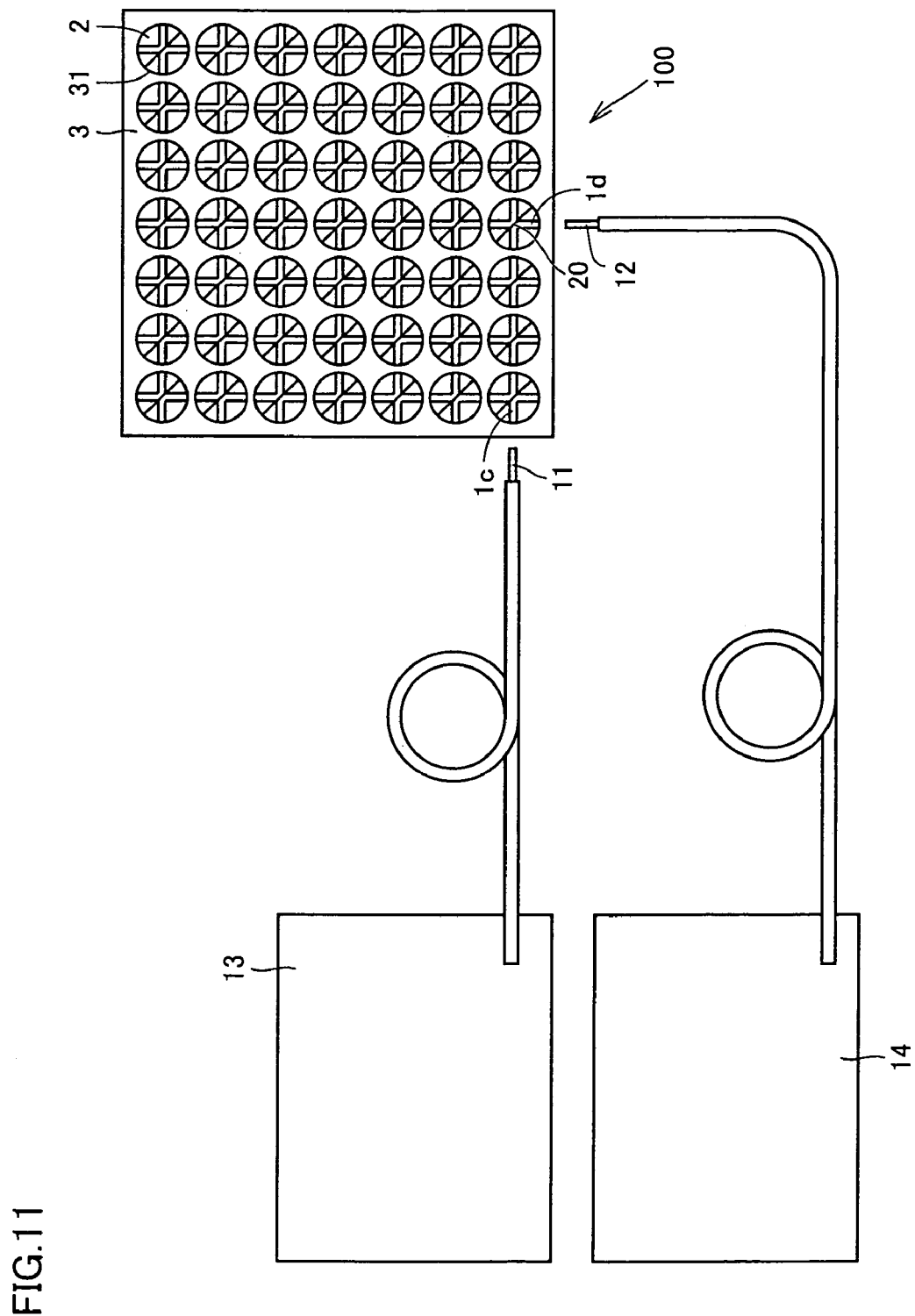
FIG. 11 is a conceptual diagram of a method of manufacturing an optical switch according to a third embodiment of the present invention.

A method of manufacturing an optical switch according to a third embodiment of the present invention is described with reference to FIG. 11. In this method of manufacturing an optical switch, a cleavage step similar to that described with reference to the first or second embodiment is carried out for forming a notch 6 in each polymer optical waveguide film 2. In this step, the optical characteristics of an optical switch 100 constituted of such polymer optical waveguide films 2 are monitored. In order to perform this operation, a light source 13 and an input fiber member 11 are prepared on an output side for the optical switch 100 while a power meter 14 and an output fiber member 12 are prepared on an output side from the optical switch 100, as shown in FIG. 11.

Each keep plate 3 of the optical switch 100 is provided with a large number of through holes 31 exposing the polymer optical waveguide films 2 respectively. Each of such exposed portions includes a core intersection serving as a switching portion for a route of light. In the following description, a desired switching portion 20 is monitored, for example. It is assumed that the cleavage step is carried out for forming a notch in this switching portion 20.

In advance of the cleavage step, the input and output fiber members 11 and 12 are arranged on an input point and an output point corresponding to the desired switching portion 20 respectively, and the optical axes thereof are aligned with those of cores 1c and 1d. In other words, the optical axes of the core 1c and the input fiber member 11 are aligned with each other on the input side, and those of the core, 1d and the output fiber member 12 are aligned with each other on the output side.

If a fiber array or the like is previously mounted on the optical switch 100, corresponding input/output fiber terminals are connected with the light source 13 and the power meter 14 respectively.

When the optical axes are aligned with each other or the input/output fiber terminals are connected with the light source 13 and the power meter 14, a pressing member starts pressing the polymer optical waveguide film 2. The quantity of light output from the core 1d, which is extremely small in an initial uncloven state, is gradually increased as the switching portion 20 is brought into a reflective state following progress of cracking. In order to repetitively press up the polymer optical waveguide film 2 with the pressing member, the position of the pressing member in a direction parallel to the surface of the polymer optical waveguide film 2 is so controlled as to maximize the quantity of the light output from the core 1*d* every pressing. Such pressing is repeated until the quantity of light output from the core 1*d* is not further increased beyond that obtained in previous pressing.

If the optical characteristics are not monitored, the cleavage step is carried out while setting conditions such as the quantity for pressing up the polymer optical waveguide film 2 with the pressing member, the pressing time and the like. In this case, the cleavage step may possibly be terminated before the notch is formed up to a sufficient depth. Alternatively, the notch may possibly be formed up to the sufficient depth in an early stage, to thereafter merely cause unnecessary stress.

According to the third embodiment, the optical characteristics are so monitored that only a necessary and sufficient press-up operation can be properly performed. Therefore, a highly reliable optical switch can be obtained.

Fourth Embodiment

A method of manufacturing an optical switch according to a fourth embodiment of the present invention is described with reference to FIGS. 12 and 13. According to this method of manufacturing an optical switch, a polymer optical waveguide film 2 formed with a notch 6 by cleavage similar to that performed in any of the first to third embodiments is subjected to a step of crushing a switching portion from a surface provided with the notch 6. This crushing step is now described in detail.

Figure 12:
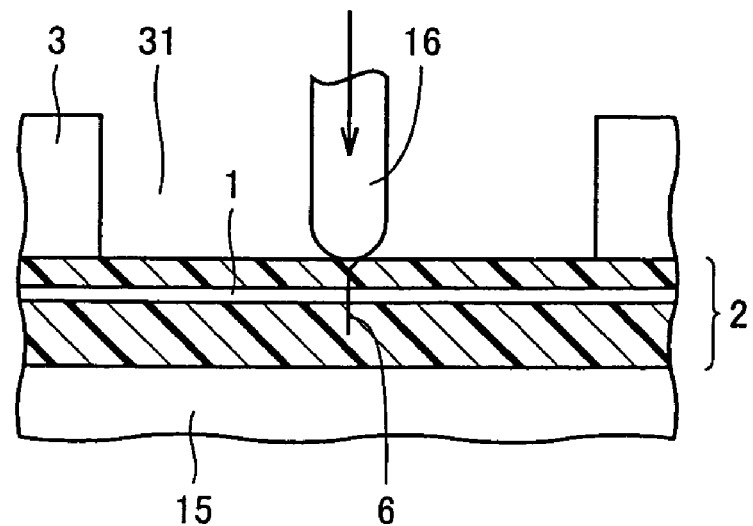
FIG. 12 is an explanatory diagram of a crushing step included in a method of manufacturing an optical switch according to a fourth embodiment of the present invention.

As shown in FIG. 12, the polymer optical waveguide film 2 is placed on a flat base 15, and a pressing member 16 is arranged above the notch 6. Contact points between a core intersection 7 and the pressing member 16 are aligned with each other. The portion provided with the notch 6 is pressurized with the pressing member 16 from above the surface provided with the notch 6, i.e., from above the upper surface of the polymer optical waveguide film 2. The load for this pressurization is set to a level substantially equal to that necessary for starting plastic deformation of the polymer optical waveguide film 2.

In this cleavage, the polymer optical waveguide film 2 is pressed up with a pressing member 4, to slightly cause plastic deformation. Consequently, the notch 6 extremely slightly opens. According to the fourth embodiment, this deformation can be recovered for approximating the notch 6 to an adherent state by carrying out the step of crushing the switching portion. Consequently, it is possible to reduce transmission loss and crosstalk in a transmissive state.

Figure 13:
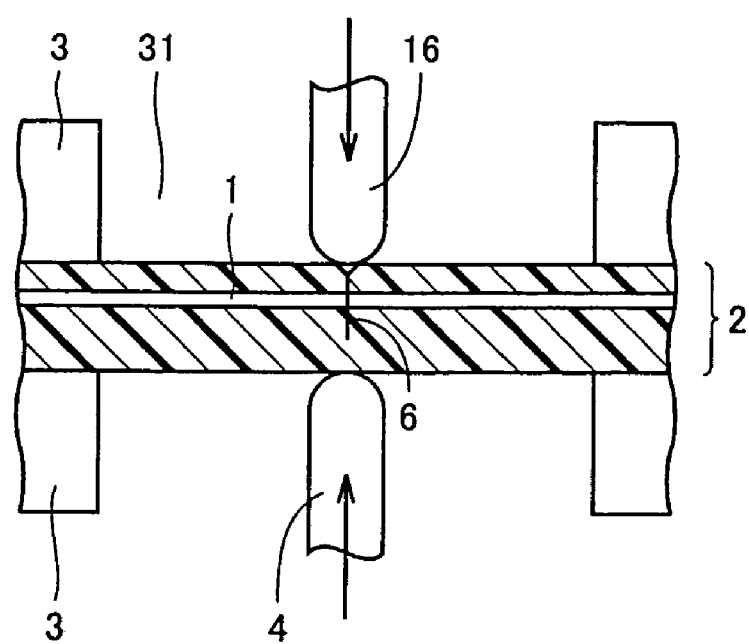
FIG. 13 is an explanatory diagram of a modification of the crushing step included in the method of manufacturing an optical switch according to the fourth embodiment of the present invention.
Figure 14A:
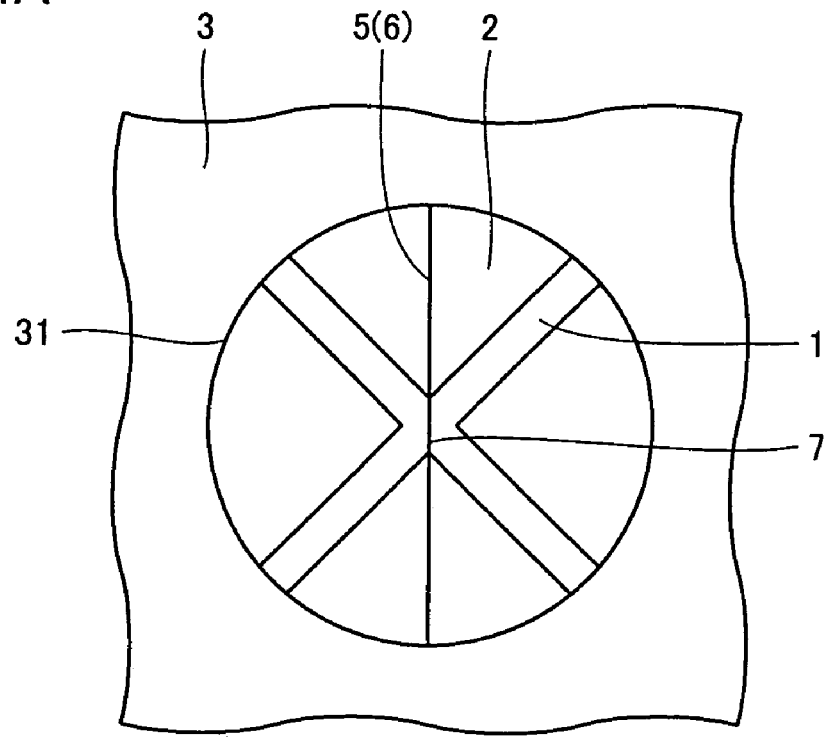
FIGS. 14A and 14B are explanatory diagrams showing a cleavage step for forming a notch in an optical switch according to a fifth embodiment of the present invention.
Figure 14B:
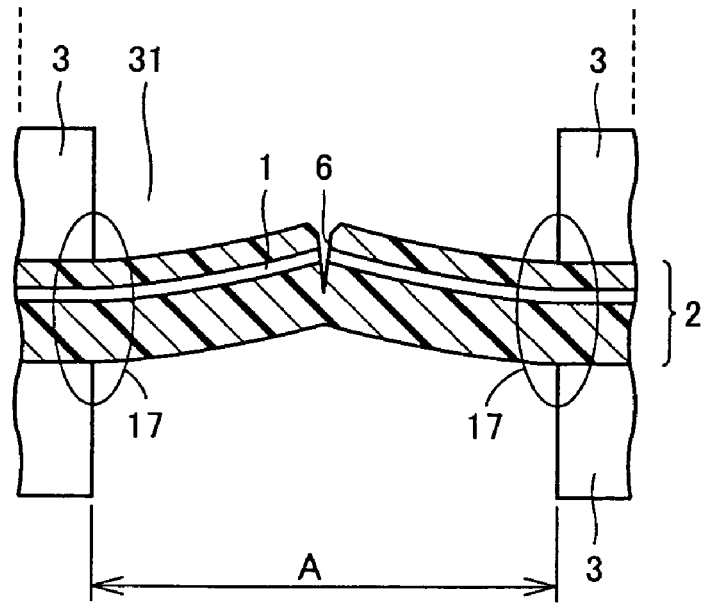

The polymer optical waveguide film 2, which is placed on the flat base 15 to be subjected to the step of crushing the switching potion in the fourth embodiment, may alternatively be supported from below by the pressing member 4 employed for the cleavage, as shown in FIG. 13. In this case, the pressing members 4 and 16 vertically hold the polymer optical waveguide film 2 therebetween, for carrying out the crushing step.

In the crushing step, the polymer optical waveguide film 2 may be supported from below not by the flat base 15 or the pressing member 4 employed for the cleavage but by still another member so far as this member can inhibit the polymer optical wave guide film 2 from downward movement resulting from pressurization from above.

Fifth Embodiment

Figure 15A:
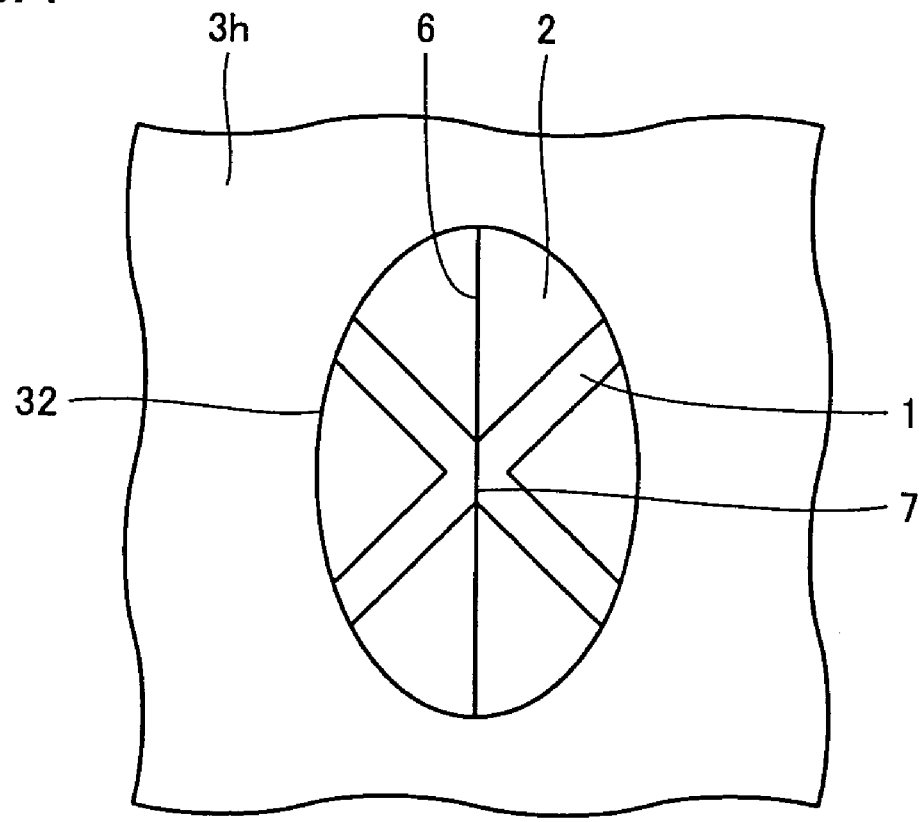
FIGS. 15A and 15B are a plan view and a sectional view of the optical switch according to the fifth embodiment of the present invention respectively.
Figure 15B:
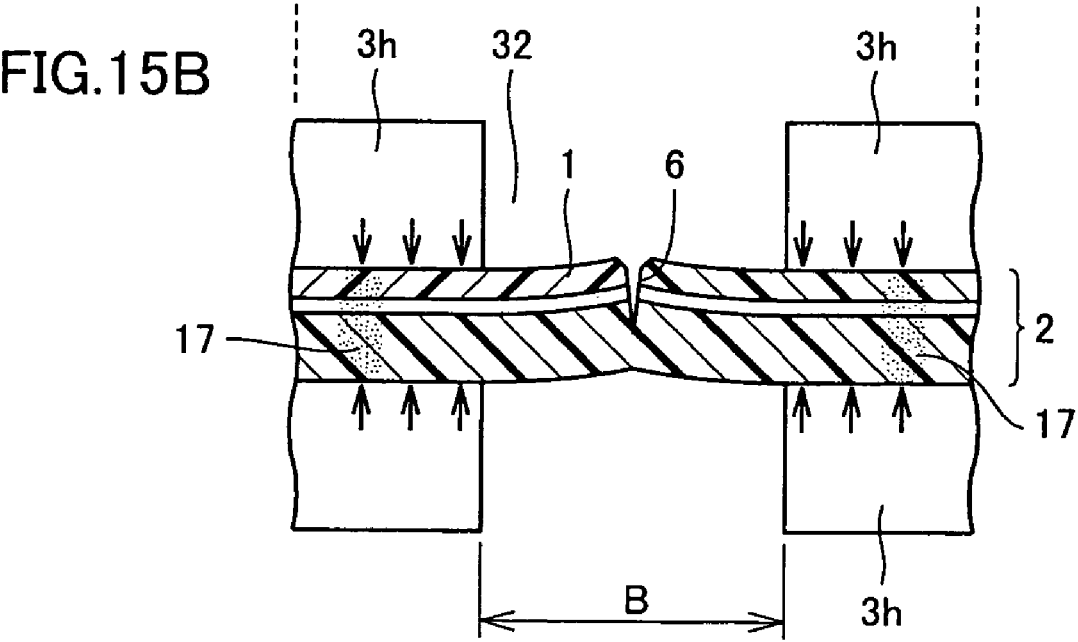

An optical switch according to a fifth embodiment of the present invention is described with reference to FIGS. 14A, 14B, 15A and 15B. As shown in FIGS. 15A and 15B, this optical switch includes a structure obtained by holding a polymer optical waveguide film 2 with keep plates 3*h* therebetween. The keep plates 3*h* are provided with through holes 32 exposing a core intersection 7 therethrough. The remaining structure of this optical switch is basically similar to that described with reference to the first embodiment.

However, the optical switch according to the fifth embodiment has a notch 6 different from that in the first embodiment. This notch 6 is formed not through the upper through hole 32 serving as a switching through hole but through another upper through hole 31 shown in FIGS. 14A and 14B. Keep plates 3 shown in FIGS. 14A and 14B, which are different from the keep plates 3*h* provided on the finished optical switch, are cleavage keep plates, and the through hole 31 is a cleavage through hole. In other words, the notch 6 is formed by pressing a switching portion with a pressing member 4 from the backside of a starting groove 5 while holding the polymer optical waveguide film 2 so that the core intersection 7 serving as the switching portion is exposed from the through hole 31 serving as the cleavage through hole thereby causing cleavage. After the notch 6 is formed with the cleavage keep plates 3 in the aforementioned manner, the polymer optical waveguide film 2 is taken out and held by the keep plates 3*h* having the through holes 32 serving as the switching through holes again.

The width A of the through hole 31 serving as the cleavage through hole in a direction (horizontal direction in FIG. 14A) perpendicular to the notch 6 is larger than the width B of the through holes 32 serving as the switching through holes in the direction (horizontal direction in FIG. 15A) perpendicular to the notch 6.

The optical switch according to the fifth embodiment is assembled in the aforementioned manner.

In a cleavage step necessary for progressing cracking, excess stress must temporarily be caused in the polymer optical waveguide film 2 by press-up working. At this time, the polymer optical waveguide film 2 may cause plastic deformation on a portion of the pressing member 4 in contact with the polymer optical waveguide film 2 or portions 17 (see FIG. 14B) around the inner peripheral edges of the through holes 31 of the keep plates 3 holding the polymer optical waveguide film 2. According to the fifth embodiment, however, the through holes 31 employed for the cleavage step and the through holes 32 for performing switching in the optical switch in practice have such different shapes that the width A of the former is greater than the width B of the latter (A>B). In other words, the switching through holes 32 have the width B narrower than the width A of the cleavage through hole 31 in the direction perpendicular to the notch 6, whereby the portions 17 causing plastic deformation in the cleavage step are held between the switching keep plates 3*h* as shown in FIG. 15B. When the optical switch is assembled, therefore, the polymer optical waveguide film 2 is so held as to rectify the plastic deformation caused on the portions 17, whereby influence by the plastic deformation resulting from the cleavage step can be reduced. In other words, the notch 6 formed through the cleavage step is so readily closable that a transmissive state can be easily implemented.

While the aforementioned embodiments include those described with reference to only single switching potions, the optical switch according to the fifth embodiment may include only one switching portion or a plurality of switching portions in a single polymer optical waveguide film 2. In the latter case, the switching portions are preferably arranged in the form of a lattice similarly to the optical switch 100 shown in FIG. 11, while the same may alternatively be arranged in another manner.

According to the present invention, the notch formed by causing cleavage without introducing a cutter or the like has a flat workface with no irregularity resulting from abrasion. Therefore, reflection loss can be reduced in a reflective state. Further, no cut margin results in the notch formed by cleavage. Therefore, transmission loss can be reduced in a transmissive state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical switch comprising:
    a polymer film including an internal linearly extending optical waveguide and a notch, the notch extending across the switching portion and being centrally located in said optical waveguide;
    a keep plate having a switching through hole transverse to said polymer film, said polymer film being clamped by said keep plate with said switching portion located within said switching through hole; and
    driving means for selecting a route of light propagating in said optical waveguide by approximating and separating a gap of said notch, wherein
        said notch is formed by precedently forming a starting groove in a first surface of said polymer film and pressing said switching portion with a pressing member from a second surface of said polymer film, opposite the first surface of said polymer film, while clamping said polymer film with said keep plate, thereby causing cleavage of said polymer film at said starting groove, and
        said starting groove is located above a center of said optical waveguide by a distance longer than half the mode field diameter of a beam propagating through said optical waveguide.

2. The optical switch according to claim 1, wherein the width of an upper end of said starting groove is not more than 1 µm at the deepest position of said starting groove.

3. The optical switch according to claim 1, wherein the bottom of said notch is arcuate as viewed from a side, perpendicular to a longitudinal direction of said polymer film.

* * * * *